United States Patent [19]

Cowan

[11] Patent Number: 4,874,213
[45] Date of Patent: Oct. 17, 1989

[54] METHOD OF FORMING VOLUME PHASE REFLECTION HOLOGRAMS

[75] Inventor: James J. Cowan, Lexington, Mass.

[73] Assignee: Polaroid Corporation, Cambridge, Mass.

[21] Appl. No.: 204,379

[22] Filed: Jun. 9, 1988

Related U.S. Application Data

[62] Division of Ser. No. 84,568, Aug. 10, 1987.

[51] Int. Cl.$^4$ .............................................. G03H 1/28
[52] U.S. Cl. .................................. 350/3.67; 350/3.77; 350/3.85
[58] Field of Search .................... 350/3.67, 3.69, 3.75, 350/3.77, 3.81, 3.82, 3.85, 3.86, 320

[56] References Cited

U.S. PATENT DOCUMENTS

| | | | |
|---|---|---|---|
| 3,623,798 | 11/1971 | Sheridon | 350/3.85 X |
| 4,458,977 | 7/1984 | Arns et al. | 350/3.6 |
| 4,512,624 | 4/1985 | Nicholson | 350/3.69 |

OTHER PUBLICATIONS

"Periodic Phase Diffraction Gratings with Near Focusing Properties", by R. S. Engelbrecht and K. Knop, RCA Tech. Report ZRRL-75-TR-006, May 14, 1975.
"Color Separation Gratings", by H. Dammann, Applied Optics, vol. 17, No. 15, Aug. 1, 1978, pp. 2273-2279.
"Blazed Holographic Gratings—Formation by Surface Waves and Replication by Metal Electroforming", by J. J. Cowan, Proc. SPIE, vol. 240, 1980, pp. 5-12.
"Optical Lithography", by F. H. Dill, IEEE Trans. Elec. Dev., vol. ED-22, No. 7, Jul. 1975, pp. 440-444.
"Factors Affecting Linewidth Control Including Multiple Wavelength Exposure and Chromatic Aberration", by A. R. Neureuther, P. K. Jain & W. G. Oldham, SPIE, vol. 275, Semiconductor Microlithography VI, 1981, pp. 110-115.
"Reduction of Photoresist Standing-Wave Effects by Post-Exposure Bake", by E. D. Walker, IEEE Trans. Elec. Dev., vol. ED-22, No. 7, Jul. 1975, pp. 464-466.
"Projection Printed Photolithographic Images in Positive Photoresists", by M. A. Narasimham, IEEE Trans. Elec. Dev., vol. ED-22, No. 7, Jul. 1975, pp. 478-482.
"Generation of Periodic Surface Corrugations", by L. F. Johnson, G. W. Kammlott and K. A. Ingersoll, Appl., Optics, vol. 17, No. 8, Apr. 15, 1978, pp. 1165-1181.
"The Color Patterns of Butterflies and Moths", by H. F. Nijhout, Scientific American, Nov. 1981, pp. 140-151.
(S91540122) Afanas'eva, V. L., et al., "Method of Producing Rulings with a Stepped Profile", Sov. J. Opt. Technol., 45(10), Oct., 1978, pp. 644-645.
(©1979, The Optical Society of America).

Primary Examiner—Bruce Y. Arnold
Assistant Examiner—David J. Edmondson
Attorney, Agent, or Firm—Francis J. Caufield

[57] ABSTRACT

A hologram is fabricated by opening a volume phase reflection hologram formed in a recording medium such as a positive photoresist. The opening occurs by forming a second hologram, such as an off-axis hologram, in the same recording medium. The opening hologram can be replicated in metal and the metal can be used to emboss the fringe pattern of the opened hologram into plastic. A full range of colors in the visible spectrum may be obtained by metallizing the embossed plastic structure and then by overcoating it with appropriate clear dielectric layers.

12 Claims, 7 Drawing Sheets

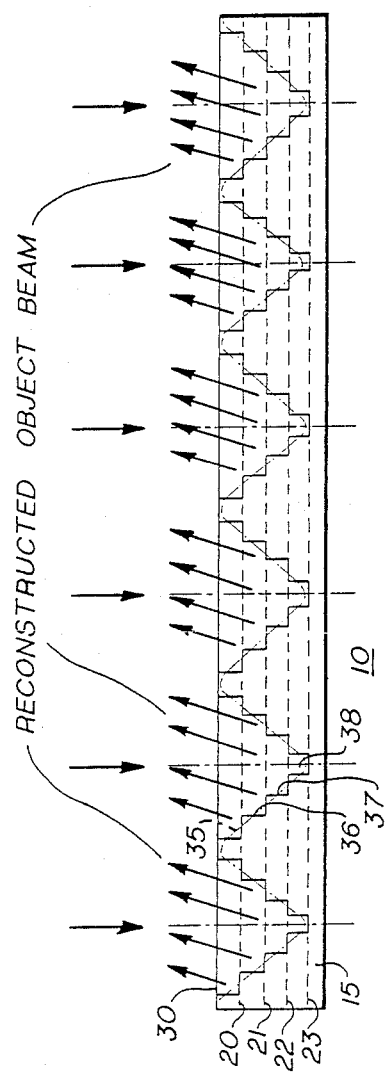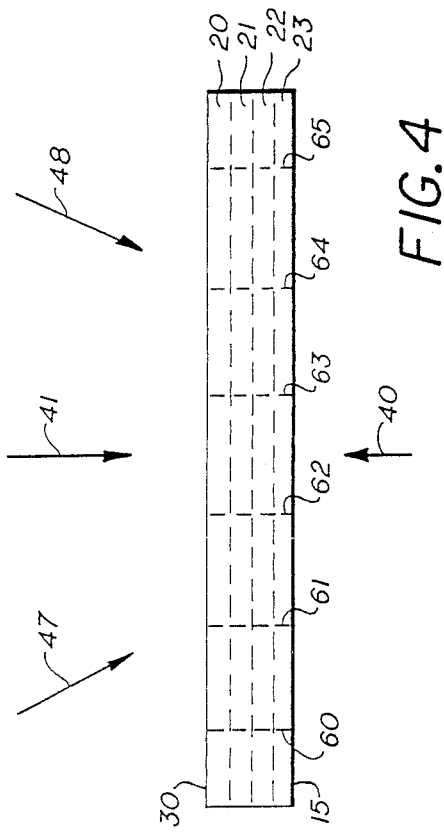

METHOD OF FORMING VOLUME PHASE REFLECTION HOLOGRAMS

CROSS REFERENCE TO RELATED APPLICATION

This is a division of application Ser. No. 084,568, filed Aug. 10, 1987.

TECHNICAL FIELD OF THE INVENTION

The present invention pertains to volume phase reflection diffraction gratings and holograms.

BACKGROUND OF THE INVENTION

A hologram is a recording of an interference fringe pattern between two beams of light. One of these beams usually comprises light reflected from a real object and is called an "object beam," while the other beam is usually a pure and unmodulated beam and is called a "reference beam." If the object beam is pure and unmodulated like the reference beam, then a set of regular interference fringes is recorded and the hologram is referred to as a holographic diffraction grating. When a hologram is illuminated with only the reference beam, the object beam is exactly reproduced in phase and amplitude.

There are two types of holographic recording configurations that are in prevalent use today. The first is called an off-axis, or "Leith-Upatniaks," hologram. In forming this type of hologram, the object beam and the reference beam impinge upon a recording medium from the same side and from directions which are separated by a small angle As shown in FIG. 1, the planes of the resulting interference fringes, which planes bisect the angle, are formed substantially perpendicular to the surface of the recording medium. Holographic diffraction gratings and embossed display holograms in use today are predominantly formed from this type of hologram.

This hologram is considered to be an improvement over the original hologram invented by Gabor, before the advent of the laser and its coherent light made off-axis configuration possible. With the Gabor, or in-line hologram, the object and reference beams fall in a line on the same axis. Because of the considerable difficulties involved in separating these beams, this hologram never came into wide use. As shall be seen later, however, one embodiment of the present invention exploits this configuration to useful advantage.

Embossed display holograms are typically formed from off-axis holograms in a multi-step process. The first step usually involves making a primary off-axis hologram where the real object is positioned some distance from the surface of the recording medium and the reference beam is a collimated or parallel beam. The second step usually involves illuminating the primary off-axis hologram with a collimated beam of light to project a real image of the object into space. A second hologram is then made by positioning a new recording medium at the position of the projected real image and by introducing a new reference beam at an angle. After development, the second hologram can be viewed under ordinary white light instead of laser light because color blurring is minimized for a focused image. Such a process is described in an article entitled "The Newport Button: The Large Scale Replication Of Combined Three- And Two-Dimensional Holographic Images," by J. J. Cowan, Proc. of SPIE, Vol. 462 Optics in Entertainment II, 1984, pp. 20–27.

In the second step described above, if the primary hologram is illuminated with a narrow slit of light instead of with a full aperture beam, the real image is brighter and deeper, but it exhibits parallax in the horizontal direction only and in a spectral hue of colors from blue to red in the vertical direction. The resulting "rainbow" hologram is the particular type of off-axis hologram which is most widely used today for embossed holograms.

In making embossed holograms, the recording medium used in the second step described above is typically photoresist. Photoresist is a material which, when developed, yields a surface profile whose depth is proportional to the intensity of the incident interference fringes. Since the intensity of the interference fringes of most holograms is essentially sinusoidal, the etch depth profile of the surface of a developed hologram resembles a sine wave when viewed on edge.

The third step of making an embossed hologram usually involves coating the surface of the photoresist of the hologram made in the second step with a conducting metal like silver and immersing the coated hologram in an electroplating bath to plate a layer, such as a layer of nickel, thereon. The fourth step involves using the nickel plate layer as a hard master to emboss the interference pattern into plastic that has been softened by heat, pressure, solvents or some combination thereof in a continuous fashion. Finally, in the last step, after embossing, the plastic is typically coated with a highly reflecting metal, like aluminum, to enhance the diffraction efficiency of the embossed hologram.

The second type of hologram in prevalent use today is a volume phase reflection (VPR), or "Denisyuk," hologram. In forming this type of hologram, the object beam and the reference beam impinge upon the recording medium from opposite sides and from opposite directions. As shown in FIG. 2, the planes of the resulting interference fringes are formed substantially parallel to the surface of the recording medium. These planes are spaced apart within the recording medium at a distance which is equal to one-half the wavelength of the recording light divided by the index of refraction of the recording medium. Typical recording media used in the art are fine grained silver halide emulsions—for which the interference fringe planes comprise regions of high density of developed silver—or dichromated gelatin or photopolymer—for which the interference fringe planes comprise regions of slight differences in the index of refraction in comparison with lower exposed regions. When a VPR hologram is illuminated with white light, only light having the same wavelength as that of the light that was used in recording is reflected back to the viewer. This occurs because the interference fringe planes that are stacked a half wavelength apart will only coherently backscatter light of that wavelength, i.e., they allow constructive interference. All other wavelengths destructively interfere and are scattered out of the field of view because they do not match the spacing of the planes A VPR hologram advantageously allows viewing at full parallax and in a single color, rather than the whole spectrum of colors which is characteristic of an off-axis hologram Further, high diffraction efficiencies can be achieved without requiring a reflective metallic coating. Still further, a VPR can be viewed from almost any angle of illumination, whereas an off-axis hologram can usually be viewed only with overhead illumination.

Notwithstanding the above-described advantages of a VPR hologram, it has not generally been considered to be feasible to replicate this structure by embossing because the fringe structure comprises a stack of parallel planes disposed within the body of the recording medium. This occurs because development of a photoresist necessarily stops at the first layer. Consequently, VPR holograms are presently replicated by optical, rather than mechanical means, and only then by using a laser. The presently known, and conventional, method of replicating VPR holograms comprises the following steps: (1) making a master hologram recording plate by directing an object beam and a reference beam to impinge upon a first recording medium from opposite sides; and (2) placing a second recording plate in front of the developed master plate and passing a second reference beam therethrough—the object light from the master is reflected and passes in the opposite direction to the second reference beam in the second recording plate and a new VPR hologram will be recorded in the new recording plate. Conventional VPR holograms can be mass replicated.

As a result, there is a need in the art for a volume phase reflection hologram which can be easily replicated.

SUMMARY OF THE INVENTION

Embodiments of the present invention are volume phase reflection (VPR) holograms which can be replicated without using an on-line laser exposure or subsequent chemical processing steps. Further, the resulting replicated hologram is dimensionally stable and is not affected by humidity, heat or other environmental factors. Specifically, embodiments of the present invention are stepped surface relief structures which are referred to below as opened or Aztec holograms. The name Aztec hologram was chosen for two reasons: (1) Aztec may be considered as an acronym for diazo photoresist technology, where diazo describes a photosensitive molecule used in an illustrative positive photoresist recording medium and, as shown in the accompanying figures, (2) Aztec brings to mind the particular pyrimidal, stepped structure which is characteristic of embodiments of the present, invention.

Embodiments of the inventive VPR or Aztec hologram are formed in accordance with the following steps of the inventive method: (1) forming a volume phase reflection (VPR) hologram in a recording medium such as a positive photoresist and (2) opening the VPR hologram by forming a second hologram in the recording medium where the second hologram may be any one of a number of holograms known in the art such as, for example, an off-axis hologram. Further, the second or opening hologram may be formed after or at the same time the initial VPR hologram is formed.

More specifically, the first step of the inventive method comprises recording a stack of substantially parallel plane interference fringes in a phase recording medium by exposing the medium to a reference beam and an object beam which enter the medium from opposite directions. Then, the second or opening step of the inventive method permits the medium to be opened up to a developer etchant. In a preferred embodiment of the inventive hologram, the recording medium is a layer of positive photoresist and the opening or second recording preferably comprises forming a holographic diffraction grating whose interference fringes are perpendicular to the surface of the recording medium. Further, the second or opening grating is preferably a hexagonal honeycomb close-packed parabolic array or a parallel line grating having triangular grooves. In further embodiments of the inventive VPR or Aztec hologram, the second or opening recording need not be restricted to being a grating. For example, the second or opening recording may also be an off-axis hologram of an object.

As a result of the above-described inventive method, an inventive VPR hologram or VPR grating formed in a photosensitive material comprises a phase relief stepped or terraced structure formed within another periodic structure. The distance between each step equals half the wavelength of the light within the medium used in the first recording, i.e., the light from the beams which entered the medium from opposite directions to form the VPR hologram. In an embodiment where the recording medium is a positive photoresist and the second or opening hologram is an off-axis hologram, the off-axis hologram opens up the surface of the recording medium to developer etchants so that lower lying planes of the interference fringe pattern can be accessed. Because developing photoresist is an ablative etching process that proceeds downward from the surface of the medium, an edge view of a profile of an embodiment of the inventive hologram comprises a set of vertical steps disposed within the medium a half wavelength apart, the vertical steps being superimposed on a sine wave. As a result, this profile resembles a stepped pyramid.

The step height of embodiments of the present invention can be varied for a given recording wavelength by changing the angle of incidence of the reference and object beams for the first recording. When the angles of both beams are the same, the step height is equal to one-half of the wavelength within the medium of the component of light which is perpendicular to the surface of the recording medium. A preferred embodiment of the inventive terraced structure is one in which the total surface area of each successive step is equal. Such a structure having a hexagonal honeycomb array is referred to as a micro zone plate. As will be further described below, the diffraction efficiency of the various orders of the diffraction pattern are a function of the number of steps in the embodiment of the structure. Further, the diffraction efficiency of the opening grating or hologram depends on the etch depth. Thus, a preferred embodiment of the inventive VPR grating and/or hologram has an etch depth which is chosen so that the diffraction efficiency of the opening grating is minimized in the first order and maximized in the zero order. Because the information content of an off-axis grating resides largely in the first order, this ensures that the image which results from the VPR or first recorded hologram will not be distorted by an image resulting from the opening or second recorded hologram.

Further embodiments of the inventive VPR grating and/or hologram comprise inventive VPR gratings and/or holograms which are overcoated with a layer of highly reflecting metal to enhance the diffraction efficiency. Still further embodiments of the inventive VPR grating and/or hologram comprise metal overcoated gratings and/or holograms which have been, in turn, overcoated with a clear dielectric.

In use, the inventive grating and/or hologram is "reconstructed" by illuminating the inventive terraced structure with a beam of light. Constructive interference is produced from light which is coherently backscattered from the inventive terraced structure at a wavelength equal to twice the step height times the index of refraction of the overcoating layer. The "reconstructed" backscattered light has the same color as the recording beam if the layer overcoating the inventive terraced structure has the same index of refraction as that of the original recording medium, assuming normal incidence of the recording beams. The "reconstructed" light has a longer wavelength than the recording beam if the step height during recording was made larger than that which occurs for normal incidence in a manner that will be explained in detail below.

Embodiments of the inventive opened VPR or Aztec hologram can be replicated in metal, and the metal can be used to emboss the fringe pattern of the inventive opened VPR or Aztec hologram into long sheets of plastic. For example, a layer of nickel may be electroplated onto an inventive structure formed in photoresist. The profile in nickel is the mirror image of the profile in photoresist. Then mass replication of the nickel pattern can be made in plastic by any of a number of methods such as by embossing using heat, pressure, solvents or some combination thereof.

Yet still further embodiments of the inventive VPR grating and/or hologram which are embossed in plastic comprise such gratings and/or holograms which have been metallized to enhance the diffraction efficiency. The color of the inventive hologram observed through the plastic base will be shifted towards blue if its index of refraction is lower than that of the original recording medium whereas the color will be shifted towards red if its index of refraction is higher than that of the original recording medium. A full range of colors in the visible spectrum may be obtained by overcoating the embossed plastic structure with a layer of highly reflecting metal and then by overcoating the metal with appropriate clear dielectric layers.

Preferred embodiments of the inventive structures also can be used to advantage as a means for optical data storage by exploiting their reflection and refractive properties.

BRIEF DESCRIPTION OF THE DRAWINGS

A complete understanding of the present invention may be gained by considering the following detailed description in conjunction with the accompanying drawings in which identical reference numerals are used to designate the same elements appearing in each figure where:

FIG. 3 shows an embodiment of the inventive Aztec holographic diffraction grating;

FIG. 4 illustrates a method for fabricating the inventive Aztec holographic diffraction grating shown in FIG. 3;

DETAILED DESCRIPTION

Figure 1:
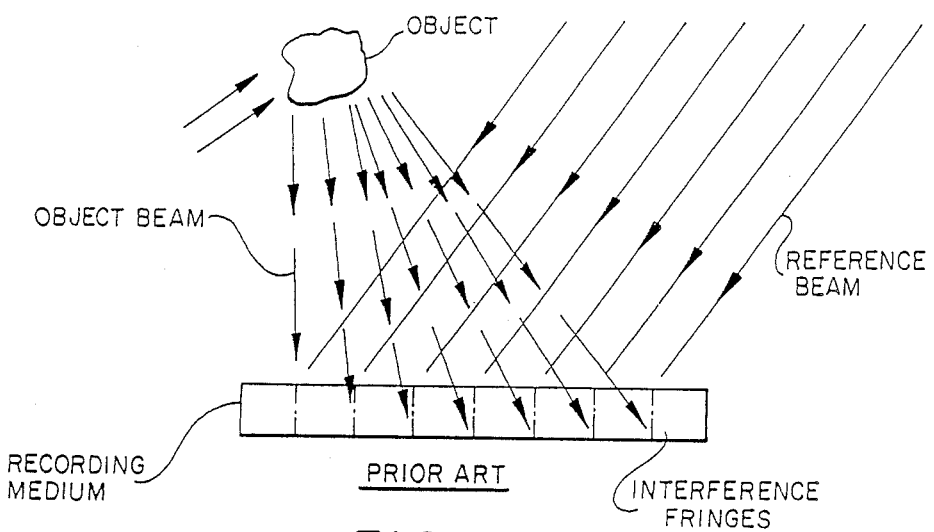
FIG. 1 shows the formation of an off-axis hologram of the prior art.
Figure 2:
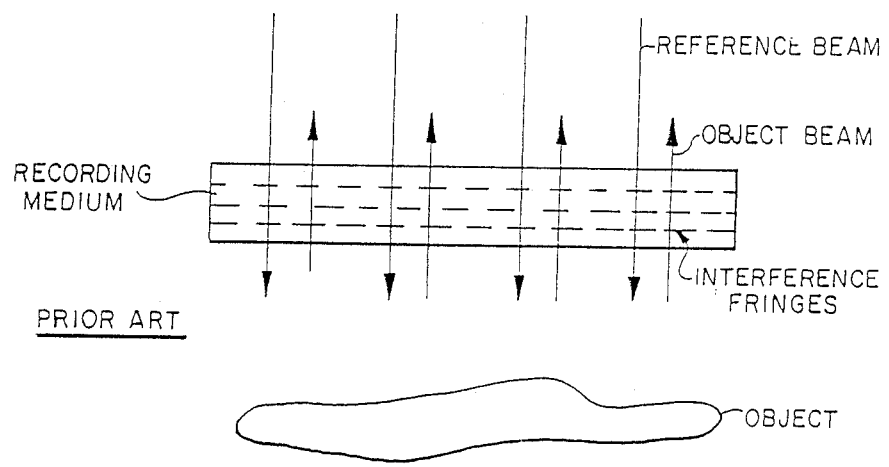
FIG. 2 shows formation of a volume phase reflection hologram of the prior art.

FIG. 3 shows inventive Aztec holographic diffraction grating 10 fabricated in accordance with the present invention. Recording medium 15 for the inventive stepped structure of this embodiment is a positive photoresist. In accordance with the inventive method, stepped structure 10 is fabricated by twice exposing recording medium 15 to interfering light beams, each exposure comprising two different orientations of the light beams with respect to recording medium 15. The first exposure provides horizontally oriented layers 20–23, and the second exposure opens up surface 30 of recording medium 15 to an etchant so that steps 35–38, and so forth, of the inventive grating are formed. As will be explained in detail below, the two exposures may be performed sequentially or simultaneously.

FIG. 4 illustrates the first exposure of the inventive method. Here, object beam 40 and reference beam 41 impinge upon recording medium 15 from opposite sides and in opposite directions. When fabricating inventive Aztec grating 15 of FIG. 3, object beam 40 and reference beam 41 are identical, i.e., pure and unmodulated. As a result of this first exposure, planes of exposure 20–23 are formed within recording medium 15 parallel to its surface, the spacing between planes 20–23 being equal to one-half the wavelength of the light within recording medium 15. For example, for an incident laser exposure wavelength of 458 nanometers and a photoresist having an index of refraction n=1.6, the spacing between planes 20–23, d=458/(2×1.6)=143 nanometers. As should be clear to those of ordinary skill in the art, a reflector can be placed on back side 45 of photoresist recording medium 15 so that the first exposure may be performed using single incident beam 41. In this case, incident beam 41 passes through photoresist layer 15, is reflected and interferes with itself.

Figure 5:
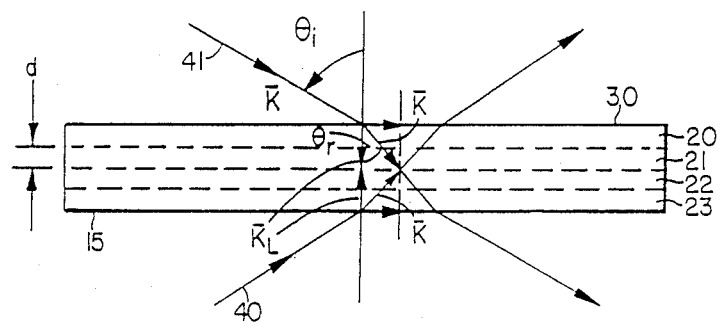
FIG. 5 illustrates a method for varying the vertical step size of a VPR hologram formed in a first exposure of the recording medium.

The spacing between planes 20–23 shown in FIGS. 3 and 4, also referred to as a vertical step, can be changed either by using incident light having a different wavelength or by changing the angle of incidence of the incident light with respect to the surface of recording medium 15. If one uses photoresist as the recording medium for fabricating the inventive grating, one is typically restricted to changing the size of the vertical step by varying the angle of incidence of the incident light because photoresist requires substantially blue light for exposure. For example, in FIG. 5, reference beam 41 impinges upon photoresist layer 15 at an angle of 60 degrees, and is refracted into photoresist layer 15 at an angle of 32.8 degrees. This occurs in accordance with Snell's law of refraction, where $\sin 60° = 1.6 \times \sin 32.8°$. In this case, the vertical step between planes 20-23 is determined by the component of the incident light which is perpendicular to surface 30 of photoresist layer 15. Thus, $d = 458/(2 \times 1.6 \times \cos 32.8°) = 170$ nanometers. Note, however, the angle of incidence within photoresist layer 15 is limited to a value determined by the critical angle, given by $\sin(\text{critical angle}) = 1/1.6$, which yields 38.7 degrees.

Figure 6:
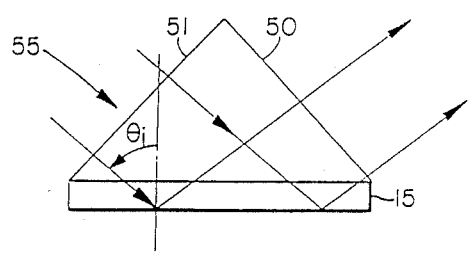
FIG. 6 illustrates another method for varying the vertical step size of a VPR hologram formed in a first exposure of the recording medium.

In further embodiments of the inventive method, the vertical step between planes 20-23 within photoresist layer 15 can be increased still further by utilizing special optical coupling techniques. As shown in FIG. 6, if photoresist layer 15 is coated onto one face of equilateral prism 50 and light beam 55 is brought into equilateral prism 50 from its back side 51 so that it is totally reflected from photoresist layer 15, then angles of incidence approaching 90 degrees are possible. In this case, a reasonable angle of incidence for a typical photoresist is 60°. Such a value yields a vertical step size between interference planes $d = 458/(2 \times 1.6 \times \cos 60°) = 286$ nanometers. Thus, by using various optical techniques, such as those described above, one can achieve a wide range of vertical step spacing between interference planes for the inventive structures.

FIG. 4 also illustrates the second exposure of the inventive method. Here, object beam 47 and reference beam 48, which are identical for this case of fabricating an inventive Aztec holographic diffraction grating, are directed so that they both impinge upon top surface 30 of photoresist layer 15. Further, object beam 47 and reference beam 48 are separated from each other by a small angle whose bisector is substantially perpendicular to surface 30. This geometry is one that is typically used to form an off-axis holographic grating, and, as a result, interference fringes 60-66 are disposed substantially perpendicularly to surface 30 of photoresist layer 15. FIG. 3 shows inventive Aztec holographic diffraction grating 10 formed as a result of the first and second exposures. The inventive grating is a terraced structure superimposed on a linear opening grating or a stepped structure formed within another periodic structure.

As described above, the first exposure provides substantially parallel planes, 20-23, within photoresist layer 15. However, as is readily apparent to those of ordinary skill in the art, development of photoresist layer 15 only exposes first layer 20. Thus, in accordance with the inventive method, the second, opening exposure fabricates an opening structure which enables one to develop at least parts of layers 20-23. However, in accordance with the inventive method, the particular type of structure fabricated in the second exposure for opening layers 20-23 is not critical. In fact, the second, opening exposure may provide an opening structure which is a grating, as has been described above, or it may even provide a hologram. Specifically, a whole host of different gratings or holograms may be fabricated as opening structures during the second exposure. For example, an appropriate opening structure is a hexagonal honeycomb grating. Such an opening structure is formed during a second exposure which comprises arranging three coherent beams symmetrically around surface 30 according to the procedure set forth in an article entitled "Holographic Honeycomb Microlens," by J. J. Cowan, Optical Engr., Vol. 24, No. 5, Sept.-Oct. 1985, pp. 796-802 (hereafter, the Cowan article) and U.S. Pat. No. 4,496,216, issued Jan. 29, 1985 to James J. Cowan and commonly assigned with this patent application, which article and which patent are incorporated herein by reference. The preferred periodicity of the fringes, which periodicity is determined by the angle between the beams, is in a range between one to several micrometers. The resulting interference fringes of the opening holographic grating formed in accordance with the method described in the article are substantially perpendicular to surface 30.

Figure 7:
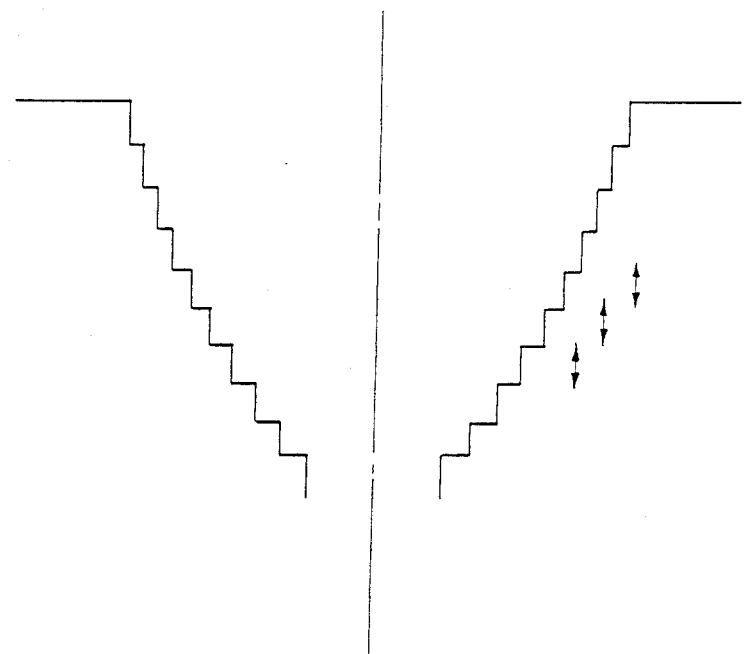
FIG. 7 shows a cross section of a portion of an inventive Aztec holographic grating having paraboloidal depressions.

By carefully controlling the etch rate when developing photoresist layer 15 of the above-described hexagonal honeycomb grating in accordance with methods which are well known to those of ordinary skill in the art, the resulting inventive Aztec grating comprises an array of parabolically shaped depressions in the surface of photoresist layer 15. In particular, as is wellknown to those of ordinary skill in the art, such parabolic depressions are produced in positive photoresist when one uses an etchant which has a nonlinear etch rate. Because regular vertical steps of the VPR grating which is formed as result of the first exposure are superimposed on the paraboloidal depressions which are formed as a result of the second exposure, the resulting structure comprises a set of ring-shaped steps with each ring-shaped step having the same area. A cross section of one depression in the resulting structure shown in FIG. 7 constitutes a zone plate within each hexagonal hole, i.e., a micro zone plate.

Still further alternative embodiments of methods for providing an opening structure are adaptable for use in forming inventive Aztec gratings or holograms. The following embodiments are meant to be illustrative only and should not be considered to limit the invention in any manner. Examples are: (1) a suitable opening structure may be formed during a second exposure which comprises exposing, the recording medium to four coherent beams according to the procedure set forth in the Cowan article; (2) a suitable opening structure may be formed during a second exposure which comprises exposing the recording medium to an single beam through an overlying mask—one example of such a suitable mask is a coarse Ronchi grating which comprises alternate clear and opaque areas; (3) a suitable opening structure may be formed during a second exposure which comprises exposing the recording medium to light scattered randomly, for example, an off-axis opening grating is fabricated by exposing the recording medium to a pure, unmodulated beam and a beam which has been reflected or transmitted through a diffuse scattering plate such as frosted glass—the randomly scattered light interferes with the pure, unmodulated beam to give a random phase perturbation; (4) a suitable opening structure may be formed in the developmental step if in the preparation of the resist surface in the prebake step there is provided a "skinning-over" or desensitization of the top surface layer. Such desensitization, for example, can result from the forced air drying of the resist surface at a typical prebake temperature between 80 and 90 degrees C. In this case, for a uniform exposure certain developers may preferentially etch in a somewhat random fashion in certain areas over other adjacent areas, thus opening up the surface to the lower lying levels. Note that the function of the second or opening exposure is to expose the surface of the photoresist so that the step structure of the first exposure can etch in well defined terraces.

Figure 8:
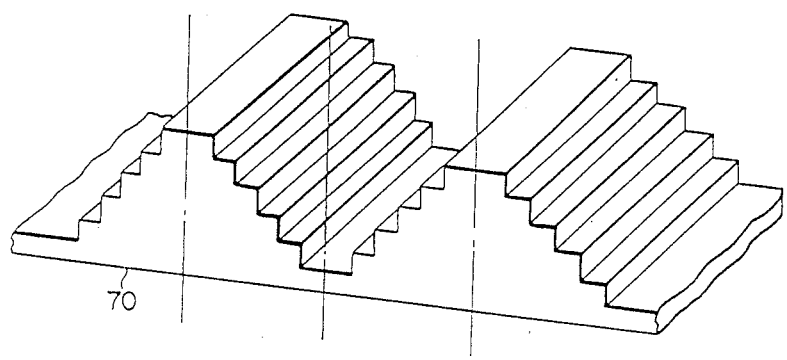
FIG. 8 shows an inventive Aztec holographic grating having elongated triangular grooves.

FIG. 8 shows a triangular groove, straight line grating 70 that has been fabricated by using a two-beam off-axis opening exposure. It is well-known to those of ordinary skill in the art as to how such a triangular groove may be fabricated by using an appropriate combination of linear and nonlinear etch rate developers—use of a linear developer where the etch rate is proportional to the development provides a sinusoidal profile whereas the use of a nonlinear developer which requires more exposure to obtain the same amount of etching provides a profile which more closely approximates a square wave. In this case, the two-beam straight line opening grating may provide steps having approximately equal areas.

In light of the above-described methods of fabricating inventive Aztec holographic diffraction gratings, there are several basic differences between a conventional VPR diffraction grating and/or hologram known in the art and the inventive Aztec holographic diffraction grating and/or hologram. A first difference between a conventional VPR grating and/or hologram known in the art and the inventive Aztec grating and/or hologram concerns the amount of incident light that is reflected from each. Successive layers formed in the recording medium of a conventional VPR grating and/or hologram are substantially transparent. As a result, only a small amount of reflection occurs from each of these layers. Thus, essentially all the incident light impinges upon each successive layer of the grating and/or hologram. Consequently, because the recording medium is essentially transparent, the surface area available for reflection at each successive layer is equal to the area of the recording surface and, thus, is the same for each successive layer. Consequently, light that passes through a conventional VPR hologram is multiply reflected from many layers. In contrast, in the case of the inventive Aztec grating and/or hologram, only a small fraction of the total surface area of each successive layer is available for reflection, that being the area of each successive step of the terraced, structure. As a result, the effective area for reflection corresponds essentially to the area of the surface of the grating or hologram, i.e., the area of one of the layers of the conventional VPR grating and/or hologram. Consequently, less information content is provided by an inventive Aztec grating and/or hologram than is provided by a conventional VPR grating and/or hologram.

A second difference is that an Aztec holographic diffraction grating and/or hologram has an additional opening structure, for example, an off-axis holographic grating, superimposed on the stepped structure of a VPR diffraction grating and/or hologram. As a result, light that is incident on an inventive Aztec grating and/or hologram is diffracted by the stepped VPR grating and/or hologram and by the opening grating and/or hologram. Thus, in considering the diffraction efficiency of the inventive Aztec grating and/or hologram, the efficiency of both structures, i.e., the grating and/or hologram, formed in each exposure must be taken into account. In order to properly take into account the diffraction efficiency of the VPR grating and/or hologram versus the diffraction efficiency of the opening structure, I have considered the following approximate model to provide an understanding of the inventive structure.

Consider the opening grating to be a relatively coarse, but continuous, periodic structure whose interference fringes are predominantly perpendicular to the surface of the recording medium. Then, consider that another, finer, quantized step structure resulting from interference fringes predominantly parallel to the surface is superimposed upon this coarse structure. This stepped, or terraced, structure may also be referred to as phase quantization. I have performed an approximate mathematical analysis of this structure which shows that there is a significant difference in the diffraction efficiency of the structure when quantized steps are present and when they are not.

The information content of conventional off-axis holograms is concentrated in the first order diffracted light. As a consequence, one typically attempts to maximize the first order diffracted light and to minimize the zero order or reflected light. My simple analysis of the diffraction efficiency of a conventional grating shows that, in general, for normal incidence light most of the diffracted light is equally divided into the first orders on each side of the grating normal, and the efficiency of the first order is out of phase with the efficiency of the zero order light. This means that when the efficiency of the zero order diffracted light is minimal, the efficiency of the first order diffracted light is maximal, and vice versa In this case, both efficiencies are a function of phase which is, in turn, directly related to etch depth. Consequently, as the etch depth increases, more light goes into the first order diffracted light. Thus, in developing a conventional off-axis hologram formed in photoresist, one typically etches to a depth which is sufficient to achieve a phase angle which maximizes the first order reflected light. In accordance with the above, this also minimizes the zero order reflected light.

However, the design goal for an inventive Aztec grating and/or hologram is the opposite of the above-described goal for an off-axis hologram The first and higher-order diffracted light of the off-axis hologram is of little interest and one wishes to maximize instead the light diffracted by the Aztec grating and/or hologram This light may be considered to reside in the zero order reflected light.

Here a distinction has to be made between the information content of the opening grating and that of the Aztec grating and/or hologram. In general the information content of any hologram resides in the first and higher order diffracted light, and the zero order refers only to unmodulated undiffracted light. In this case, however, there are two diffractive structures, i.e., the coarse opening structure and the fine Aztec stepped structure. Here the zero order of the opening structure provides a reservoir of light for the Aztec structure. Thus the first order diffracted light of the Aztec structure is equivalent to the zero order reflected beam of the opening structure. This interpretation may be compared to that given by Kogelnik in the coupled-wave analysis of deep hologram efficiencies (H. Kogelnik, "Coupled Wave Theory for Thick Hologram Gratings", Bell Syst. Tech. J., 48, 2909 (1969). In this analysis the zero-order light is the incident beam, and its intensity is depleted as it passes through the fringe structure, exchanging its energy with the first order diffracted light. For a VPR grating, this diffracted light constitutes the reflected beam, what we have here called the "zero order reflected beam". For a VPR hologram of an actual object, the reflected beam is modulated in both intensity and direction. Thus, the interpretations of the coupled-wave analysis and the model considered here are equivalent.

My model shows that the efficiency of the Aztec grating depends critically on how well quantized the steps are. This results from the fact that the efficiency of the zero order diffracted light for an "unstepped" grating starts at approximately 100% for zero phase, goes to zero at $2\pi$, and then oscillates between low values and zero thereafter, the zeroes occurring at phase differences of $2\pi$. In contrast, the efficiency of the zero order diffracted light for an inventive stepped grating also starts at 100% for zero phase, but it then oscillates between 0% and 100%, the zeroes occurring at phase values which equal odd multiples of n and the values of 100% occurring at phase values which equal even multiples of $\pi$. Further, when the zero order diffracted light is minimal, the first order is maximal and vice versa. Thus, if the steps of an inventive grating are not sufficiently quantized, i.e., the steps are so ill-defined that the grating looks like a conventional grating, the zero order diffracted light will be approximately zero at $2\pi$ instead of the desired level of approximately 100%. This result provides two important design requirements for an inventive Aztec grating and/or hologram: (1) the steps should be formed to a depth that is some multiple of the basic step height, each additional step providing a phase difference of $2\pi$ and (2) it is necessary to form the steps carefully so that the stepped profile is well-defined. With regard to etching of a photoresist recording medium, this second design requirement means that the inventive structure should be fabricated by using a nonlinear etchant in order to provide well quantized steps. As is known to those of ordinary skill in the art, such nonlinear etchants are weak developers and hence require a longer time to develop the structure than would be the case for a linear developer. As a result, the steps of an inventive Aztec grating will be well-defined parallel structures. However, the steps of an inventive Aztec hologram, for which the image of a real object is formed, will be modulated, i.e., they will no longer be strictly parallel because some of the light reflected from a large object will impinge upon the recording medium at large angles and the step height can change slightly.

My analysis of the inventive structure also shows that, as the number of vertical steps gets larger, the bandwidth of the zero order diffracted light gets smaller even though the intensity does not increase as the bandwidth gets smaller. In principle, one could achieve an arbitrarily small bandwidth simply by increasing the number of steps. However,, practical considerations, which take into account periodicity and aspect ratio, limit the number of steps to perhaps no more than ten, with five or six being the usual number. This is in contrast to the typical 20 to 100 layers of a typical conventional VPR hologram.

High reflectivity can be achieved with the conventional VPR hologram because of the large number of layers and because, as described above, the entire surface area of the hologram plate can be used for each of the successive layers. With the inventive Aztec hologram, on the other hand, there is effectively only a single, stepped layer so that the nearest that one can approach perfect reflectivity with the inventive Aztec structure is to coat it with a highly reflecting, usually vacuum evaporated, metal layer. When this is done the reflectivity of each step approaches 100 percent—actually, over 95 percent for a silver layer, and over 90 percent for an aluminum layer. Thus, the percentage of the total incident light reflected by each successive step is almost equal to the fractional surface area of that step. For example, if there are 10 steps in a micro zone plate array, then each step has the same area and reflects back 10 percent of the incident light, assuming perfect reflectivity.

A third difference between a conventional VPR hologram and the inventive Aztec hologram occurs as a result of considering index of refraction. For a conventional VPR hologram, there is a relatively small change in index from one layer to another over a relatively large number of layers. This provides an increasingly narrow bandwidth as the number of layers increases, but only up to a certain point. Increasing the number of layers beyond that point results in a broadened bandwidth. For an inventive Aztec hologram, on the other hand, the index changes are large and the number of steps is small, however, there is no saturation point in bandwidth that occurs, as a result of increasing the number of steps.

As was described above, the color selectivity of a VPR hologram depends on the recording wavelength, the same color being obtained in reflection as was used in construction. Whether one will obtain the same color back depends, in actual practice, on the absence of swelling or shrinking of the stacked layers. Since photoresist exhibits great structural stability, this is not a consideration when inventive Aztec holograms are fabricated from such a medium.

Color variation of the reflected light can be obtained in an inventive Aztec hologram in two distinct ways. One method of varying the color of the light reflected from an inventive Aztec grating and/or hologram, which method was described above, is to vary the angle of incidence of the beams during the first exposure so that different step spacings are obtained. Since the color of the reflected light depends on this spacing, considerable control can be exercised in color variation in this way. This is illustrated in FIG. 6 which shows the use of prism coupling as a means for varying the vertical step spacing.

Another method of varying the color of the light reflected from an inventive Aztec grating and/or hologram arises as a result of the fact that an Aztec hologram is an open structure that is normally coated with a reflective metal layer after the vertical steps have been formed. This highlights a fourth difference between a conventional VPR hologram and an inventive Aztec hologram. With the conventional VPR hologram, the average index of refraction of a photosensitive layer is essentially the same after exposure and processing as it was before exposure. In contrast, for an inventive Aztec hologram, the two exposures are made in photoresist, which has a comparatively large index of refraction, for example, $n=1.6$, but after processing and overcoating with metal, the incident light approaches the inventive stepped structure from air, which has a small index of refraction, $n=1$. As a result, the inventive stepped structure will coherently backscatter light having a wavelength equal to twice the step height. For example, when the step height $d=143$ nanometers for a normal incidence exposure in fabricating the inventive structure, the reflected light will have a wavelength of 286 nanometers, which is in the ultraviolet. To obtain backscattered light with the same wavelength as the exposing light, the metal coated stepped structure would have to be coated with a clear dielectric layer having an index of refraction $n=1.6$. In this case, the wavelength of the reflected light is twice the step height times the index of refraction, or $286 \times 1.6 = 458$ nanometers, which wavelength is the same as that of the blue light used in the initial exposure during fabrication.

As a consequence of the above, many different colors may be achieved by coating the inventive metal structure with clear dielectric layers having different indices of refraction. For example, if the inventive structure were coated with a clear dielectric having an index of refraction n=2.0, the reconstructed reflected wavelength would be 286×2.0=572 nanometers, which is yellow. If, on the other hand, one used a dielectric material having an index of refraction n=1.4, the reconstructed reflected wavelength would be 286×1.4=400 nanometers, which is violet. Further, if the angle of incidence during fabrication were changed from 0° to 60°, and a vertical step spacing of d=170 nanometers were obtained, then using an overcoating layer having an index of refraction n=2.0, the reconstructed reflected wavelength would be 170×2×2.0=680 nanometers, which is red; for n=1.4 and d=170 nanometers, the color would be 170×2×1.4=476 nanometers, which is blue-green. It should be clear to those of ordinary skill in the art that it is possible to achieve many different colors by using either or both of the above-described color shifting techniques. In practice, however, there may be some restriction on the range of index of refraction of available dielectric overcoating materials. Organic liquids presently exist which have indices of refraction which are as high as 1.75, but very few clear plastic dielectrics exist which have indices of refraction above 1.6 or below 1.4.

All of the basic considerations described above with respect to the inventive Aztec grating carry over exactly to the inventive Aztec hologram, the only difference being in the method of recording. As described above, an Aztec grating is fabricated by creating interference between two pure, unmodulated beams moving in opposite directions and then by providing an opening structure. In fabricating an Aztec hologram, a pure, unmodulated beam moving in one direction must interfere with a beam moving in the opposite direction which has been reflected from a real object. In order to fabricate the Aztec hologram, it is critical that stability be maintained throughout the exposure process.

Further, if the opening structure is a grating, especially a hexagonal honeycomb grating as described above, the etching or development must be done carefully to ensure that the diffraction efficiency of the opening grating is close to zero. Otherwise, the diffracted spectra from the opening grating will distract from the image of the object we wish to view. This problem can be overcome if the opening structure is a standard off-axis hologram of the object. This geometry allows the structure hologram to be highly developed in areas where the intensities were the highest, and, as a result, more of the stepped structure is exposed. At the same time, the diffracted light from the off-axis hologram is maximum in the same areas as maximum diffraction efficiency was expected, from the stepped Aztec structure. Further, the same considerations for diffraction efficiency apply here for an inventive Aztec hologram as were described above for the Aztec grating, namely, when the off-axis hologram becomes dim, the Aztec hologram becomes bright.

It is also possible to make the opening structure an on-axis, or Gabor hologram of the object. In this case a twin image of the object is formed, one corresponding to the +1 diffraction order, and the other, to the −1 diffraction order, that appear simultaneously on the same axis. Upon development, these images gradually disappear and a single VPR type image appears in their place.

Figure 11:
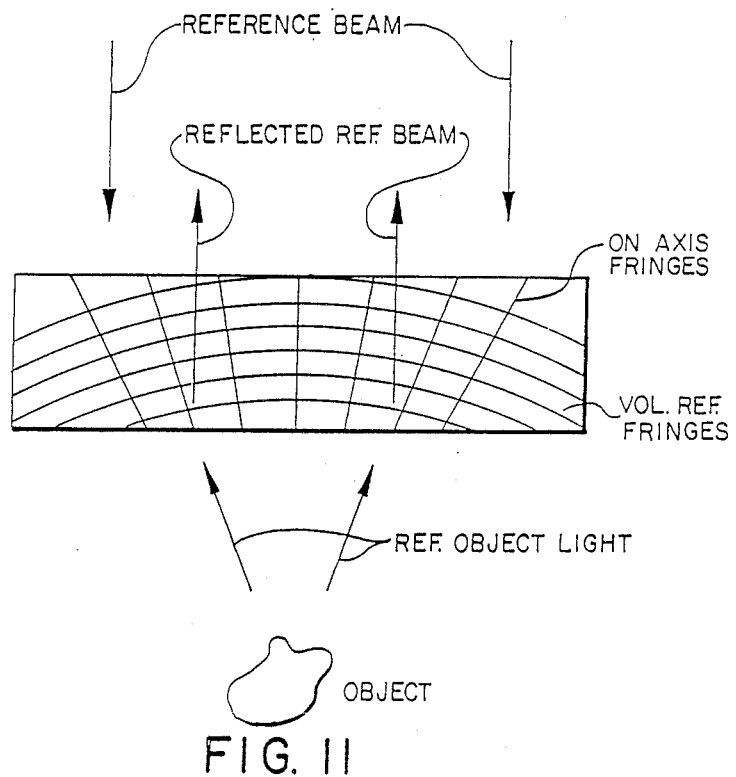
FIG. 11 illustrates an in-line configuration for recording an inventive hologram or holographic diffraction grating.
Figure 12:
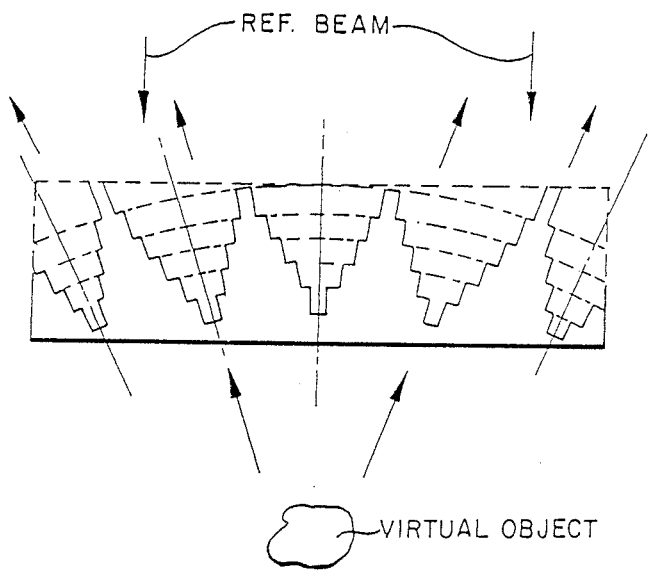
FIG. 12 illustrates an in-line configuration for reconstructing a hologram or holographic diffraction grating formed as in FIG. 11.

The in-line configuration can probably be best realized by reference to FIG. 11. This shows a reference beam passing through a layer of photoresist and striking an object on the other side. Reflected object light then passes in the opposite direction through the photoresist layer. The wavefronts of the reference beam are planar, but those of the object light are curved, as if they were issuing from the point-like object. In addition, a portion of the reference beam is reflected in the opposite direction from the back side of the photoresist layer. This reflected reference beam is now propagating in the same general direction as the object beam. There will thus be a set of reflection interference fringes formed between the reference beam and the object beam which are substantially parallel to the surface, and there will be another set of interference fringes between the reflected reference beam and the object beam that are substantially perpendicular to the surface. This latter set of fringes constitutes the opening hologram. FIG. 12 shows the developed surface of the photoresist layer with the stepped Aztec structure superimposed on the coarse opening structure. Interference fringes between the incident and reflected reference beams, are not significant because of low contrast due to the significantly different intensities of these two beams. The general principle shown here is not changed if the incident beam comes into the photoresist layer at some angle, since the components of light that are responsible for the fringe structure are still perpendicular to the surface and the reflected reference beam and the object beam are still in the same general direction.

Figure 9:
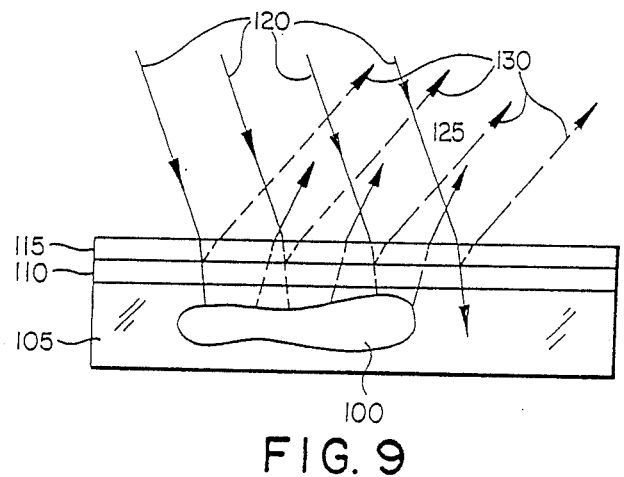
FIG. 9 illustrates a first arrangement for fabricating an Aztec hologram.
Figure 10:
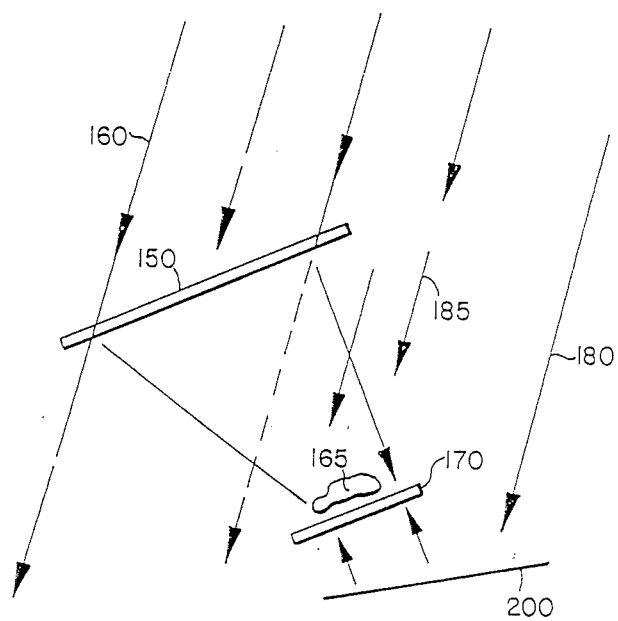
FIG. 10 illustrates a second arrangement for fabricating an Aztec hologram.

FIGS. 9 and 10 show two other recording configurations for fabricating inventive Aztec holograms. In FIG. 9, actual object 100, which is to be imaged, is encapsulated in an index matching material 105 adjacent to photoresist recording layer 115, which is coated on glass surface 110. Recording beam 120 is incident on glass surface 110 and passes through it to impinge upon object 100. Light 125 is reflected from object 100 back through photoresist layer 115. As a result, a stepped structure is formed within photoresist layer 115. At the same time, a small portion of the light from reference beam 120 is reflected at the interface between resist layer 115 and glass layer 110. This reflected incident light 130 now interferes with light 125 reflected from object 100, and, if the angle between reflected incident light 130 and light 125 is slightly different, an off-axis hologram will be formed. If this angle is very small, or substantially zero, then the hologram will be formed substantially on axis and thus will be an in-line, or Gabor hologram. If the intensity levels provided by the off-axis hologram are sufficiently high when compared to those of the stepped structure, then upon development, the lower lying steps are opened up by a developer etchant and an Aztec hologram is formed.

An alternative to this technique is the replacement of the actual object 100 with a standard VPR hologram of the object. This hologram can be made using techniques and materials well known in the art, but done with such a combination of recording angles that the diffraction efficiency is maximized for the particular incidence angle that will be actually used in making the Aztec hologram.

In a second recording configuration for fabricating inventive Aztec holograms, a master hologram of the object is made using a collimated reference beam. Then, as shown in FIG. 10, master hologram 150 is repositioned, reversed and illuminated by reference beam 160.

As a result, projected real image 165, having the same size as the object is generated and serves as an object beam incident on one side of recording photoresist surface 170. A portion of reference beam 180 impinges upon mirror 200 and is reflected so that it enters recording plate 170 from one direction and another portion of recording beam 185 enters recording plate 170 from the opposite side. The stepped structure is formed by projected real image 165 and by the portion of reference beam 185 whereas the off-axis opening hologram is formed by portion of recording beam 180 and projected real image 165 which are incident at a slight angle to each other and on the same side of recording plate. The configuration shown in FIG. 10 requires electronic fringe locking to ensure stability for the stepped structure over the time of the exposure.

Figure 13:
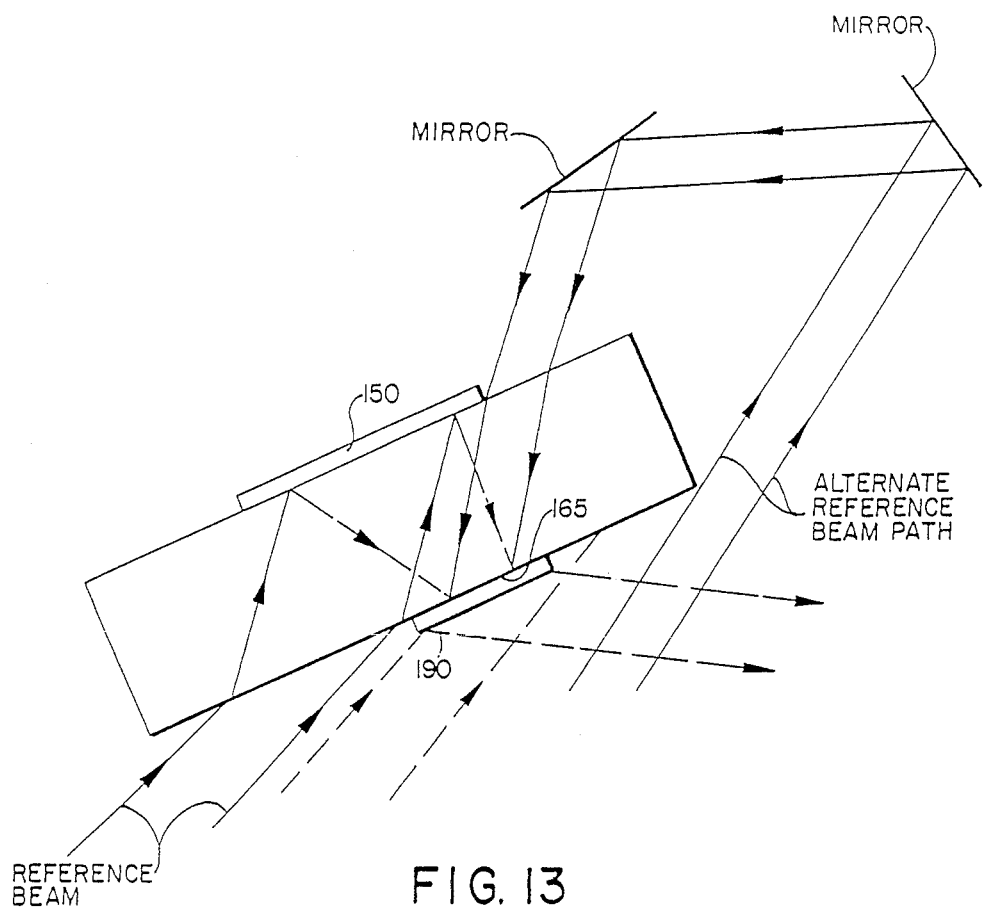
FIG. 13 illustrates yet another arrangement for exposing an inventive hologram and/or grating.

In an alternative embodiment of this recording configuration, the master hologram 150 is coated with a vacuum evaporated layer of aluminum and attached onto a clear slab of plastic, for example, Plexiglass TM, of such thickness that the reflected projected image 165 is focused onto the opposite side when illuminated by a collimated reference beam, as shown in FIG. 13.

A portion of the reference beam illuminates the recording plate 170 from the opposite side as the real image light beam, and these two beams then constitute the stepped structure. There are two options for providing the opening hologram. With the first option a portion of the reference beam is split off by mirrors so that the light enters the slab from the same side as the object light, thus allowing an off-axis hologram to be formed. With the second option a portion of the reference beam will be reflected from the recording plate 170, as indicated by the dotted lines in FIG. 13. If the angle of incidence is sufficiently large, the reflectivity from plate 170 will be sufficient to form either an off-axis or in-line hologram of the object.

The method outlined here has the advantage of providing more stability for the formation of the stepped fringes than that of FIG. 10, and of thus minimizing the need for electronic fringe locking. Attachment of the master hologram 150 and the recording plate 170 can, for example, be made with an index matching cement, such as clear epoxy.

When an inventive Aztec hologram has been formed in photoresist it can be replicated using standard techniques which are well-known in the art. For example, the photoresist plate is coated with a conducting metal, for example, evaporated silver, immersed in an electroplating bath, and a layer of nickel is plated onto the surface. When electroplating is completed, the resist layer is stripped away and the nickel plate constitutes a mirror image of the pattern formed in photoresist. The pattern of an Aztec grating in photoresist, for example, using a honeycomb opening grating, resembles an array of inverted pyramids. The pattern in the nickel replica, on the other hand, is an array of upright pyramids.

The nickel replica can now be used to emboss the pattern into plastic. As long as the steps of the structure are well defined, with no undercutting, the embossing can be performed in a conventional manner which is well-known in the art by using ,heat, solvent, pressure or some combination thereof to initially soften the plastic. Care should be taken during embossing to minimize distortions, especially those which might occur in the vertical direction, because, as discussed above, variations in the step height will decrease the diffraction efficiency.

If the embossed pattern is now overcoated with metal, such as aluminum, the hologram or grating can be viewed through the protective plastic layer. If the index of refraction of the plastic is the same as photoresist, then the color will be the same as the recording color. If the index of the plastic is lower than photoresist, as is usually the case, then the color will be shifted toward the blue.

A variation of the above-described procedure involves coating the aluminized surface of the plastic with a different layer of plastic, one whose index is adjusted, in the manner described above, to a desired color. If one uses several different types of plastic to coat different parts of the hologram, then a multicolor image can be produced.

The inventive Aztec structure disclosed above can be applied as a means for forming optical data storage. In general, one wishes to have a recording medium coated in a thin layer on a disk so that information can be stored point by point by a laser beam that is focused onto the surface. One example of such a storage is a series of pits or depressions which are impressed along the tracking groove of a disk. The information is retrieved with another focused laser beam by detecting differences in reflectivity from the pitted surface. If the pitted surface is prepared in such a way that it cannot be altered or erased, then the memory is referred to as ROM or read-only-memory.

The use of the inventive Aztec structure in fabricating data storage relies on the differences in reflectivity that are obtained between continuous gratings and deep stepped gratings or deep stepped gratings that have different index overcoating layer materials. As discussed above, a grating having a deep triangular continuous groove profile yields zero order diffraction grating efficiencies that approach zero as the phase angle gets larger. If the groove is stepped, however, these efficiencies approach 100% if the incident wavelength is equal to twice the step height spacing. Thus, there is a very large difference in reflectivity between these two cases.

A conventional optical data storage disk contains a spiral track with a track-to-track spacing of about 1.6 micrometers. If the sides of the track are impressed with a stepped reflective structure and the track is made of, for example, embossed or injected molded plastic and has no metallic overcoating, the reflectivity will in general be low, i.e., less than 5%. With an opaque aluminum coating, however, the reflectivity will be over 90%. If the coating is now made thinner so that it is partially transparent, the reflectivity can still be made relatively high, say 50%. If the embossed plastic is made absorbing by dying or some other means at the writing wavelength, then that portion of the incident light that is not reflected will transmit through the metal layer and be absorbed by the plastic. The light intensity will be sufficiently high to just melt the fine sidewall stepped structure so that it will fuse together and form a continuous sloped surface. When this occurs, the reflectivity from the groove will be characteristic of a deep triangular profile with its low reflectivity rather than the high reflectivity of the stepped surface. Thus, in this embodiment, the storage of data depends on local destruction of deep Aztec structure at certain locations along the spiral track and forms a read- only-memory.

A further embodiment utilizes the difference in reflectivity which is obtained by overcoating the grooved spiral with a dielectric overcoating layer and then changing the index of refraction of the layer. For example, consider a step height that is tuned to be resonant with a certain reading laser wavelength when the layer is coated with a particular dielectric. The writing laser causes a slight change in the index of refraction of the overcoating material. Then when the reading laser beam addresses this area on the track, it will no longer be resonant and the reflectivity will be low. If the change in index is permanent, this would provide a read-only-memory. If the index of refraction can be restored to its previous value, this would provide an erasable memory.

A still further embodiment is realized by the expansion or contraction of the embossed sidewall Aztec structure, more probably by the heat of the focused writing laser beam. This would be a so-called "accordion effect", whereby the entire plastic sidewall Aztec structure in the region of local heating, for example, would change its vertical dimension, such that the step spacing would be changed uniformly in that region. Such a uniform alteration of the step spacing would cause a corresponding change in the reading wavelength and thus an indication would be provided of the storage of information in that region. By the same reasoning an erasable memory would result if, for example, a temperature variation were applied to a region of expansion such that the expanded region contracted to its former dimension.

The actual stepped sidewall data storage structure can be made using combination mask overlays by optical lithography and/or laser exposures in a photoresist layer on a suitable substrate. The desired spiral track would be made by conventional techniques using ultraviolet exposure through a chromium mask. For example, if the periodicity of the mask were 1.6 micrometers and there were a flat area between tracks of 0.6 micrometer, then the mask would be a spiral of opaque chromium of width 0.6 micrometers separated by a clear spiral of width 1.0 micrometer. The mask would be placed in contact with the resist layer and exposure made with the UV lamp. This could be done either before or after the laser exposure. The step structure would be provided by a laser exposure through the back side of the resist layer using prism coupling as described in FIG. 6. One assumes that the resist has been coated onto a clear substrate. Using the proper combination of developers and exposure, one could etch the spiral track such that the slope would not be too steep, and thus the steps would etch in well defined terraces. An alternative to using the mask overlay for the spiral track is to directly record a spiral using a focused laser beam.

Clearly, those skilled in the art recognize that further embodiments of the present invention may be made without departing from its teachings. For example, the recording medium used to fabricate the inventive Aztec holographic diffraction grating and/or hologram need not be restricted to photoresist and may be a whole host of other materials. Further, the inventive stepped structures may be made by methods other than by laser interferometry. In particular, alternate technologies include use of such methods as electron beam writing and ion beam milling. Therefore, it is intended that all matter contained in the above description or shown in the accompanying drawings shall be interpreted as illustrative and not limiting.

I claim:

1. A method for forming a volume phase reflection hologram comprising the steps of:

exposing a holographic phase medium by projecting onto one of its surfaces two beams disposed at an angle to one another to form in said medium interference fringes that are substantially perpendicular to said surface and have a predetermined periodicity; and further exposing said medium with from opposite sides with two more beams to form therein interference fringes that are parallel to said medium surfaces and of finer periodically than that of said predetermined periodicity of said perpendicular fringes so that both said parallel and perpendicular interference fringes combine to provide as exposure pattern in said medium that varies in exposure level both over the surface and depth of said medium in the form of fine generally varying multiple steps distributed depthwise in the medium within a coarser surface pattern.

2. The method of claim 1 which further includes the step of coating the surface of the medium with a metal.

3. The method of claim 2 which further includes the step of overcoating the metal with a dielectric.

4. The method of claim 1 which further includes means for varying the angle with which the two beams enter the opposite sides of the medium.

5. The method of claim 1 further comprising the step of developing said medium to remove exposed material therefrom to provide a holographic stepped relief structure whose shape is substantially the complement of said exposure pattern.

6. The method of claim 1 wherein one of the beams used to further expose said medium from opposite sides thereof is a beam from an object.

7. The method of claim 6 wherein said medium is coated on a transparent substrate and said object is encapsulated in an index matching medium on the other side of said substrate and wherein said object is illuminated from a reference beam incident to the exposed surface of said medium whereby said parallel fringes are created by the interference between the reflection of the reference beam from the object with the incoming reference beam and said perpendicular fringes are created by the interference between the reflection of the reference beam off the interface between said substrate and said medium and the reference beam reflected from the object.

8. The method of claim 1 wherein the step of further exposing said medium from opposite sides thereof with two beams further comprises the step of placing a reflecting medium on one side thereof and projecting a single beam through said medium from one side thereof onto said reflecting medium to provide a reflected beam therefrom directed back through said medium from the same side on which the reflecting medium is placed so that the original beam and reflected beam interface to provide said parallel fringes.

9. The method of claim 1 wherein one of the beams used in making said further exposure of said medium is an object beam from a master hologram that is reconstructed by illuminating it with a reference beam.

10. The method of claim 9 wherein said holographic medium is disposed in front of and at a angle to a mirror and wherein a portion of the reference beam used to reconstruct said master hologram impinge on said mirror and is reflected thereby toward the other side of said holographic medium while another portion of said reference beam directly impinges on the other side of said holographic medium.

11. The method of claim 1 wherein the periodicity of both of said interference patterns is regular.

12. A method for forming a volume a volume phase reflection hologram comprising the steps of:
- exposing a holographic phase medium to form in said medium interference fringes that are substantially perpendicular to said surface and have a predetermined periodicity; and
- further exposing said medium from opposite sides with two more beams to form therein interference fringes that are parallel to said medium surfaces and of finer periodicity than that of said predetermined periodicity of said perpendicular fringes so that both said parallel and perpendicular interference fringes combine to provide an exposure pattern in said medium that varies in exposure level both over the surface and depth of said medium in the form of fine generally varying multiple steps distributed depthwise in the medium within a coarser surface pattern.

* * * * *